United States Patent
Chen et al.

(10) Patent No.: US 9,503,308 B2
(45) Date of Patent: Nov. 22, 2016

(54) METHOD, DEVICE AND SYSTEM FOR PROCESSING CONTENT

(71) Applicant: Huawei Technologies Co., Ltd., Shenzhen (CN)

(72) Inventors: Jian Chen, Shenzhen (CN); Hong Zhou, Shenzhen (CN);
(Continued)

(73) Assignee: Huawei Technologies Co., Ltd., Shenzhen (CN)

(*) Notice: Subject to any disclaimer, the term of this patent is extended or adjusted under 35 U.S.C. 154(b) by 431 days.

(21) Appl. No.: 14/065,941

(22) Filed: Oct. 29, 2013

(65) Prior Publication Data
US 2014/0059158 A1 Feb. 27, 2014

Related U.S. Application Data
(63) Continuation of application No. PCT/CN2011/077511, filed on Jul. 22, 2011.

(51) Int. Cl.
*H04L 12/26* (2006.01)
*G06F 15/167* (2006.01)
*H04L 29/08* (2006.01)

(52) U.S. Cl.
CPC ....... *H04L 29/08549* (2013.01); *H04L 67/101* (2013.01); *H04L 67/1008* (2013.01);
(Continued)

(58) Field of Classification Search
USPC ................................ 709/213, 223, 225, 224
See application file for complete search history.

(56) References Cited

U.S. PATENT DOCUMENTS

| 6,081,840 A | 6/2000 | Zhao |
| 8,001,271 B1 * | 8/2011 | Malan ............... H04L 29/12066 709/245 |

(Continued)

FOREIGN PATENT DOCUMENTS

| CN | 1941736 A | 4/2007 |
| CN | 10116244 A | 4/2008 |

(Continued)

OTHER PUBLICATIONS

Kawaguchi, Shou, MapReduce & Hadoop Unrestricted, Conquer Big Data / Cloud Technology / Hadoop & NoSQL, Japan, ASCII Media Works Co. Ltd., Apr. 25, 2011, First Edition, pp. 6 to 17.
(Continued)

*Primary Examiner* — Jude Jean Gilles
(74) *Attorney, Agent, or Firm* — Brinks Gilson & Lione

(57) ABSTRACT

The disclosure relates to a method, device and system for processing content. In the method: a server receives a content acquiring request transmitted by a terminal. The server determines a first storage node list according to a mapping relation acquired in advance between contents and storage nodes. The first storage node list includes a plurality of first storage nodes that store a first content corresponding to the content acquiring request. The server transmits a sorting request to a network storage management server and receives a sorting result transmitted by the network storage management server. The sorting result includes priorities of the plurality of first storage nodes. The server transmits a content acquiring response to the terminal, where the content acquiring response includes first access information and priority of at least one of the first storage nodes.

16 Claims, 7 Drawing Sheets

(72) Inventors: Rong Zou, Shenzhen (CN); Yuping Zhao, Shenzhen (CN)

(52) U.S. Cl.
CPC ....... *H04L 67/1021* (2013.01); *H04L 67/1063* (2013.01); *H04L 67/1072* (2013.01); *H04L 67/1076* (2013.01); *H04L 67/1097* (2013.01)

(56) References Cited

U.S. PATENT DOCUMENTS

| | | | | |
|---|---|---|---|---|
| 2006/0206662 | A1* | 9/2006 | Ludwig | G06F 3/0607 |
| | | | | 711/114 |
| 2007/0288433 | A1* | 12/2007 | Gupta | G06F 17/30663 |
| 2009/0083837 | A1* | 3/2009 | Ishii | H04L 63/10 |
| | | | | 726/4 |
| 2009/0240758 | A1 | 9/2009 | Pasko et al. | |
| 2009/0249213 | A1* | 10/2009 | Murase | G06F 9/4443 |
| | | | | 715/735 |
| 2009/0328151 | A1* | 12/2009 | Tamura | H04L 63/08 |
| | | | | 726/3 |
| 2010/0131690 | A1 | 5/2010 | Homma et al. | |
| 2012/0191710 | A1 | 7/2012 | Howe et al. | |
| 2013/0046845 | A1* | 2/2013 | Torii | H04L 67/1097 |
| | | | | 709/213 |
| 2013/0151663 | A1 | 6/2013 | He et al. | |

FOREIGN PATENT DOCUMENTS

| | | |
|---|---|---|
| CN | 101345690 A | 1/2009 |
| CN | 101500016 A | 8/2009 |
| CN | 101753568 A | 6/2010 |
| CN | 102130935 A | 7/2011 |
| EP | 2086206 A1 | 8/2009 |
| EP | 2200248 A1 | 6/2010 |
| JP | 2010287036 A | 12/2010 |
| JP | 2011-516994 A | 5/2011 |
| WO | WO 2009/087550 A2 | 7/2009 |

OTHER PUBLICATIONS

Transactional Distributed Object Foundations / TPBroker Object Transaction Monitor User Guide / Explanation / Introduction / Operation Manual / Common Manual, Japan, Hitachi, Ltd., Feb. 2002, First Edition, pp. 19 to 25.

* cited by examiner

METHOD, DEVICE AND SYSTEM FOR PROCESSING CONTENT

CROSS-REFERENCE TO RELATED APPLICATIONS

This application is a continuation of international Application No. PCT/CN2011/077511, filed on Jul. 22, 2011, which is incorporated herein by reference in its entirety.

TECHNICAL FIELD

The present disclosure relates to the technical field of content delivery, and more particularly, to a method, a device and a system for processing content.

BACKGROUND

The Internet application is being widely found in various aspects of the society with a great influence on sociality and economy. The content on the Internet is being developed into voice, video and so on from text and picture. Meanwhile, with the constant improvement on the broadband access technology, a scale of the bandwidth of each subscriber is increased to Mbps from the original 64 kbps by means of digital subscriber line (Digital Subscriber Line, referred to as DSL) technology. The bandwidth of the subscriber may be improved to the Gbps scale by means of an optical access technology, such as fiber to the home (Fiber To The Home, referred to as FTTH) technology based on passive optical network (Passive Optical Network, referred to as PON). The network traffic rises rapidly under the dual-push of the network content and network access technology.

Internet Protocol (Internet Protocol, referred to as IP) is a basic service bearing protocol of the Internet, in which a router for implementing IP message forwarding is taken as a core device for forwarding the Internet service, whose capacity is increasingly great with the growth of the network traffic. However, due to the feature of packet-by-packet forwarding of the router, the router which satisfies the demand on capacity increases correspondingly both in power consumption and volume, and the router with a great capacity is difficult in design and high in cost. Meanwhile, since an operator charges the subscriber mainly from an access network currently, there is no motivation to invest in the expansion of a backbone network which becomes a bandwidth bottleneck with an influence on the Internet application and customer experience.

One of the methods for solving the problem of bandwidth bottleneck of the backbone network is to realize the traffic localization, that is, to reduce the network burden brought by the access of the subscriber to the content by storing the content to a place closer to the subscriber. Currently, the main method for realizing the traffic localization is to establish content delivery network (Content Delivery Network, referred to as CDN), that is, to dispose CDN node servers at different regions, these CDN node servers constituting a layer of intelligent virtual network on the basis of the existing Internet. In the existing CDN system, each CDN node server not only processes a subscriber request but also provides content supplied by a content provider to the subscriber. Since different content providers may support different application layer protocols, in order to satisfy the requests from the registered subscriber of different content providers, each CDN node server needs to update or upgrade the application layer protocol when there is a new content provider. Therefore, the demand on each CDN node server is relatively high, and the system management cost is relatively high.

SUMMARY

The present disclosure provides a method, device and system for processing content, for simplifying the structure of a storage node, and reducing the cost of the system management.

The first aspect of the present disclosure provides a method for processing content, including:

receiving a content acquiring request transmitted by a terminal; determining, according to a mapping relation acquired in advance between contents and storage nodes, a first storage node list which comprises a plurality of first storage nodes; each first storage node stores a first content corresponding to the content acquiring request;

transmitting a sorting request to a network storage management server and receiving a sorting result transmitted by the network storage management server; the sorting request includes the first storage node list and address information of the terminal, and is configured to request sorting the plurality of first storage nodes; the sorting result includes a priority of each of the plurality of first storage nodes; and transmitting a content acquiring response to the terminal, the content acquiring response including first access information and priority of at least one first storage node, so that the terminal acquires the first content from the corresponding first storage node according to the content acquiring response and the network general storage protocol.

The second aspect of the present disclosure provides another method for processing content, including:

receiving a sorting request transmitted by an application server, the sorting request includes a first storage node list and address information of a terminal, and is configured to request sorting first storage nodes in the first storage node list;

sorting the first storage nodes in the first storage node list according to the address information of the terminal, network information and resource usage information of storage nodes acquired in advance; and transmitting a sorting result to the application server, the sorting result includes a priority of each of the first storage nodes in the first storage node list.

The third aspect of the present disclosure further provides an application server, including:

a receiver, is configured to receive a content acquiring request transmitted by a terminal;

a determining module, is configured to determine, according to a mapping relation acquired in advance between contents and storage nodes, a first storage node list which comprises a plurality of first storage nodes; each first storage node stores a first content corresponding to the content acquiring request after receiving the content acquiring request transmitted by the terminal;

a sorting requesting module, is configured to transmit a sorting request to a network storage management server; the sorting request includes the first storage node list and address information of the terminal, and is configured to request sorting the plurality of first storage nodes;

the receiver is further configured to receive a sorting result transmitted by the network storage management server; the sorting result includes a priority of each of the plurality of first storage nodes; and a transmitter, is configured to transmit a content acquiring response to the terminal, the content acquiring response including first access information and priority of at least one first storage node, so that the terminal acquires the first content from the corresponding first storage node according to the content acquiring response and a network general storage protocol.

The fourth aspect of the present disclosure further provides a network storage manager, including:

a receiver, is configured to receive a sorting request transmitted by an application server, the sorting request includes a first storage node list and address information of a terminal, and is configured to request sorting the first storage nodes in the first storage node list;

a sorting module, is configured to receive each of the first storage nodes included in the first storage node list according to the address information of the terminal, network information and resource usage information of storage nodes acquired in advance; and a transmitter, is configured to transmit a sorting result to the application server, the sorting result includes a priority of each of the first storage nodes of the first storage node list.

The fifth aspect of the present disclosure further provides a system for processing content, including the application server, the network storage manager and the storage node as stated above.

In the method, device and system for processing content provided by the present disclosure, the terminal transmits the content acquiring request to the application server, the application server determines the storage node which stores the content needed by the terminal and requests the network storage manager to perform sorting, the network storage manager feeds back the sorting result to the application server, and the application server determines the storage node configured to provide content for the terminal according to the sorting result, thereby contributing to the acquisition of the needed content by the terminal locally or preferably, improving the user experience and reducing the bandwidth burden of the backbone network. In addition, since the processing ability of the application layer protocol is peeled off from the storage node, the storage node writes and reads the content according to the network general storage protocol, simplifying the structure of the storage node, improving the flexibility of the deployment of the storage nodes and the convenience of maintaining the storage nodes, and reducing the system management cost.

BRIEF DESCRIPTION OF DRAWINGS

In order to explain the solution of the embodiment of the present disclosure more clearly, the drawings used in the description of the embodiment are briefly introduced below. It is obvious that the drawings in the following description are merely some embodiments of the present disclosure. Other drawings can be obtained according to these drawings without creative work for persons skilled in the art.

DESCRIPTION OF EMBODIMENTS

The solution of the embodiment of the present disclosure is clearly described in combination with the drawings in the embodiments of the present disclosure. It is obvious that the described embodiments are merely a part of the embodiments of the present disclosure instead of all embodiments. All the other embodiments obtained by persons skilled in the art based on the embodiments of the present disclosure without creative work belong to the protection scope of the present disclosure.

The ordinal number of the following embodiments of the present disclosure are merely for making description, not for representing that the former embodiments are superior to the latter ones.

Figure 1:
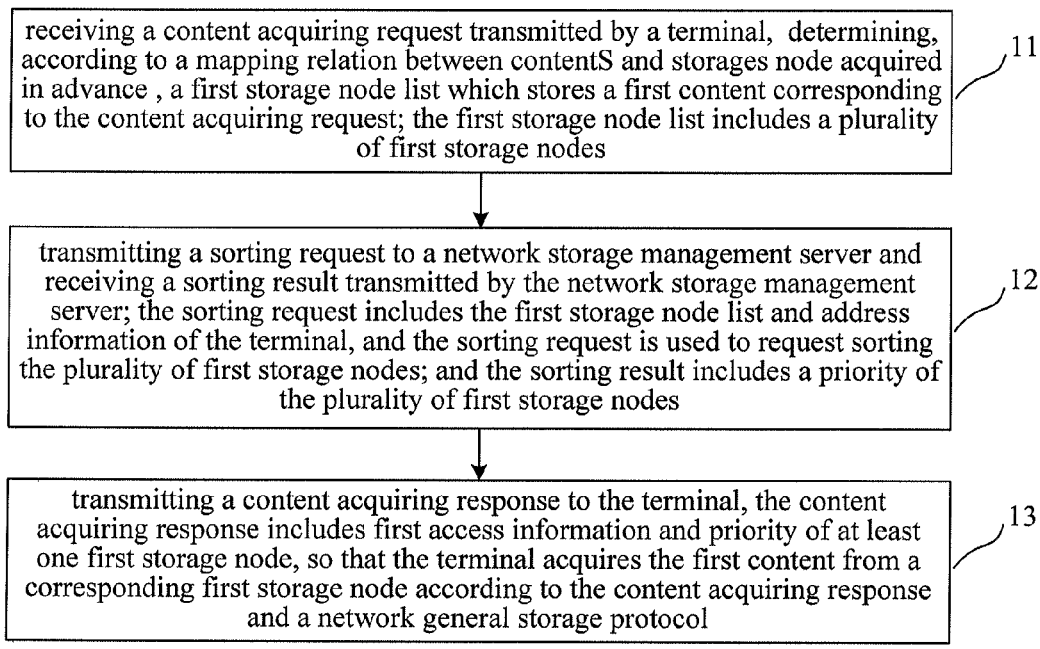
FIG. 1 is a flowchart of the method for processing content provided by the first embodiment of the present disclosure.

FIG. 1 is a flowchart of the method for processing content provided by the first embodiment of the present disclosure. An execution entity of the present embodiment may be the application server such as a source content data server of the content provider. As shown in FIG. 1, the method includes the following steps:

Step 11: receiving a content acquiring request transmitted by a terminal; determining, according to a mapping relation acquired in advance between contents storage nodes, a first storage node list which stores a first content corresponding to the content acquiring request; the first storage node list includes a plurality of first storage nodes.

The application server receives the content acquiring request transmitted by the terminal. According to different specific applications, the application layer protocols on which the content acquiring request is based may be different. The application layer protocol may be HyperText Transfer Protocol (referred to as HTTP), File Transfer Protocol (referred to as FTP), eMule, Bittorrent, etc.

In order to make description convenient, in the embodiment of the present disclosure, the content corresponding to the content acquiring request is referred to as the first content; a storage node which stores all or part of the first content is referred to as the first storage node. The application server determines the first storage node which stores the first content corresponding to the content acquiring request according to the mapping relation acquired in advance between the content and storage nodes, wherein there are usually a plurality of first storage nodes, and the application server generates the first storage node list including a plurality of first storage nodes.

Step 12: transmitting a sorting request to a network storage management server and receiving a sorting result transmitted by the network storage management server; the sorting request includes the first storage node list and address information of the terminal, and the sorting request is configured to request sorting the plurality of first storage nodes; the sorting result includes priorities of the plurality of first storage nodes.

The first storage node list may include a plurality of first storage nodes. The application server transmits a sorting request to a network storage management server. The sorting request may include the first storage node list and address information of the terminal, and is configured to request the network storage management server to sort the priorities of the first storage nodes in the first storage node list.

After receiving the sorting request transmitted by the application server, the network storage management server sorts the priorities of the first storage nodes in the first storage node list according to the address information of the terminal, the network information collected by the network storage management server and resource usage information of each of the first storage nodes acquired by the network storage management server.

Step 13: transmitting a content acquiring response to the terminal, the content acquiring response includes first access information and priority of at least one first storage node, so that the terminal acquires the first content from a corresponding first storage node according to the content acquiring response and a network general storage protocol.

Different storage nodes write and read content according to the same network general storage protocol; the terminal and the storage node interact according to the network general storage protocol. When the terminal needs to acquire the content from a certain storage node, the terminal generates a reading request according to the network general storage protocol and transmits the reading request to the storage node, the storage node receives the reading request, reads the content corresponding to the reading request and transmits the content to the terminal according to the network general storage protocol.

The network general storage protocol in the embodiment of the present disclosure may be any one of the data access protocols used in the network communication, such as, but not limited to, the following protocols: HTTP, network file system (Network File System, referred to as NFS) protocol, Internet small computer systems interface (Internet Small Computer Systems Interface, referred to as iSCSI) protocol, web-based distributed authoring and versioning (Web-based Distributed Authoring and Versioning, referred to as Web-DAV) control protocol, without repeated description.

In order to make the description convenient, in the embodiment of the present disclosure, the access information of the first storage node included in the first storage node list is referred to as the first access information.

After receiving the sorting result, the application server may determine the first storage node with the highest priority, or one or more first storage nodes with relatively high priorities, which provides the content for the terminal, according to the sorting result; and carries the determined first access information and the priority of the first storage node in the content acquiring response to transmit to the terminal.

In an optional embodiment, the content acquiring response includes the first access information of a plurality of first storage nodes with relatively high priority in the sorting result, and the priority of the respective first storage nodes. The terminal may select one or more first storage nodes from the received content acquiring response, and acquires the first content needed by the terminal from the selected first storage node(s) according to the first access information of the selected first storage node and the network general storage protocol. Optionally, if the terminal cannot acquire the content needed by the terminal from the first storage node with the highest priority in the content acquiring response, the terminal may also select other first storage nodes with relatively high priorities in the content acquiring response, and acquire the content needed by the terminal from the first storage nodes, thereby increasing the success ratio of the terminal to acquire the content.

On the basis of the above solution, optionally, the application server may also transmit the content storing request to the network storage management server. In order to make the description convenient, in the embodiment of the present disclosure, the content corresponding to the content storing request is referred to as the second content; the storage node configured to store the second content is referred to as the second storage node; the access information of the second storage node is referred to as the second access information; the storage node list includes the second access information of the second storage node is referred to as the second storage node list. The application server may receive the second storage node list transmitted by the network storage management server, the second storage node list includes the second access information of the second storage node configured to store the second content corresponding to the content storing request; and the application server may write the second content into the second storage node indicated by the second access information according to the network general storage protocol; afterwards, the application server establishes and stores the mapping relation between the second content and the second storage node, such as records the mapping relation between a content identifier recording the second content and a node identifier of the second storage node.

In the method for processing content provided by the present embodiment, when receiving the content acquiring request transmitted by the terminal, the application server transmits the sorting request to the network management server, to request sorting the storage nodes storing the corresponding content, and transmits to the terminal the access information of one or more storage nodes with relatively high priorities according to the acquired sorting result, and the terminal acquires the content needed by the terminal from the corresponding storage node by following the network general storage protocol, thereby contributing to the acquisition of the needed content by the terminal locally or preferably, improving the user experience and reducing the bandwidth burden of the backbone network. In addition, since the processing ability of the application layer protocol is peeled off from the storage node in the present embodiment, the storage node writes and reads the content by following the network general storage protocol, simplifying the structure of the storage node, improving the flexibility of the deployment of the storage nodes and the convenience of maintaining the storage nodes, and reducing the system management cost.

Figure 2:
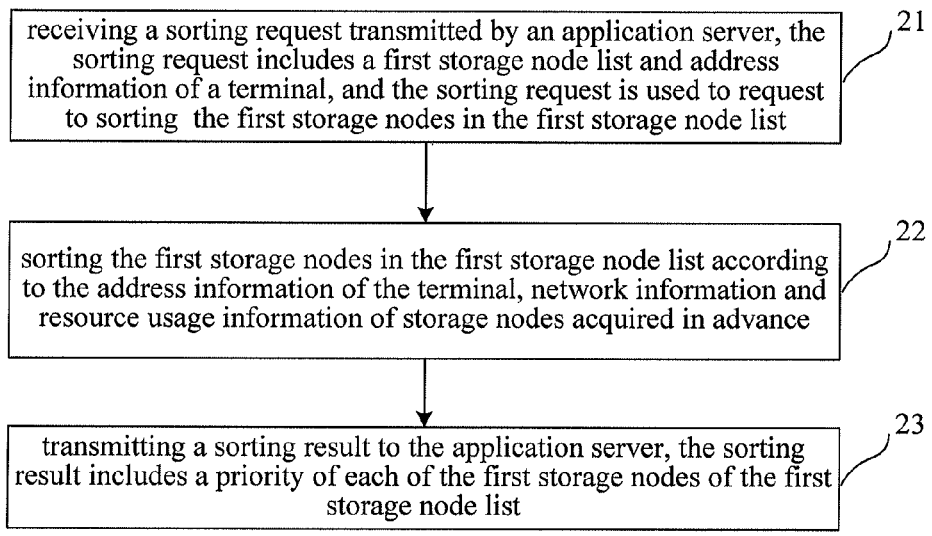
FIG. 2 is a flowchart of the method for processing content provided by the second embodiment of the present disclosure.

FIG. 2 is a flowchart of the method for processing content provided by the second embodiment of the present disclosure. The execution entity of the present embodiment may be the network management server. As shown in FIG. 2, the method includes:

Step 21: receiving a sorting request transmitted by an application server, the sorting request includes a first storage node list and address information of a terminal, and the sorting request is configured to request sorting the first storage nodes in the first storage node list.

The application server transmits the first storage node list to the network management server after receiving the content acquiring request transmitted by the terminal. The first storage node included in the first storage node list is the storage node storing the first content corresponding to the content acquiring request.

Step 22: sorting the first storage nodes in the first storage node list according to the address information of the terminal, network information and resource usage information of storage nodes acquired in advance.

After receiving the sorting request transmitted by the application server, the network storage management server sorts the priorities of the first storage nodes in the first storage node list according to the address information of the terminal, the network information collected by the network storage management server and resource usage information of each of the first storage nodes acquired by the network storage management server.

The network information includes one or any combination of the following: network routing information, network link information and routing strategy information. The resource usage information of storage nodes may include, but not limited to, one or any combination of the following contents: usage statuses of the resources such as the storage space, network bandwidth, processing ability of central processing unit (Central Processing Unit, referred to as CPU), and memory; wherein the usage status of the storage space may include, but not limited to, the following information: total storage space and the used storage space of a storage node; the usage status of the network bandwidth may include, but not limited to, the following information: the total uplink bandwidth of the network and the used network uplink bandwidth, and/or, the total downlink bandwidth of the network and the used network downlink bandwidth.

The way of acquiring the resource usage information of a storage node by the network storage manager is not limited. For example, the network storage manager may receive the resource usage information of the storage node reported by the storage node regularly; or, the network storage manager may transmit an inquiry request to the storage node, and receive the resource usage information of the storage node reported by the storage node according to the inquiry request.

Step 23: transmitting a sorting result to the application server, the sorting result includes a priority of each of the first storage nodes in the first storage node list.

After sorting the priority of each of the first storage nodes in the first storage node list, the network storage management server transmits the sorting result to the application server, so that the application server determines a first storage node configured to provide the first content for the terminal according to the sorting result.

On the basis of the above solution, optionally, the network storage manager may further receive a content storing request transmitted by the application server, and determines the second storage node list according to the content storing request and the resource usage information of storage nodes acquired in advance and transmits the second storage node list to the application server; the second storage node list includes the second access information of the storage nodes configured to store the second content corresponding to the content storing request, so that the application server writes the second content into the storage nodes indicated by the second access information by following the network general storage protocol.

In the method for processing content provided by the embodiment, the network storage manager receives the sorting request transmitted by the application server, sorts the priorities of the storage nodes storing the content needed by the terminal according to the address information of the terminal, network information and resource usage information of storage nodes acquired in advance, and feeds back the sorting result to the application server, and the application server determines the storage node configured to provide content for the terminal according to the sorting result, thereby contributing to the acquisition of the needed content by the terminal locally or preferably, improving the user experience and reducing the broadband burden of the backbone network. In addition, since the processing ability of the application layer protocol is peeled off from the storage node in the present embodiment, the storage node writes and reads the content by following the network general storage protocol, simplifying the structure of the storage node, improving the flexibility of the deployment of the storage nodes and the convenience of maintaining the storage nodes, and reducing the system management cost.

Figure 3:
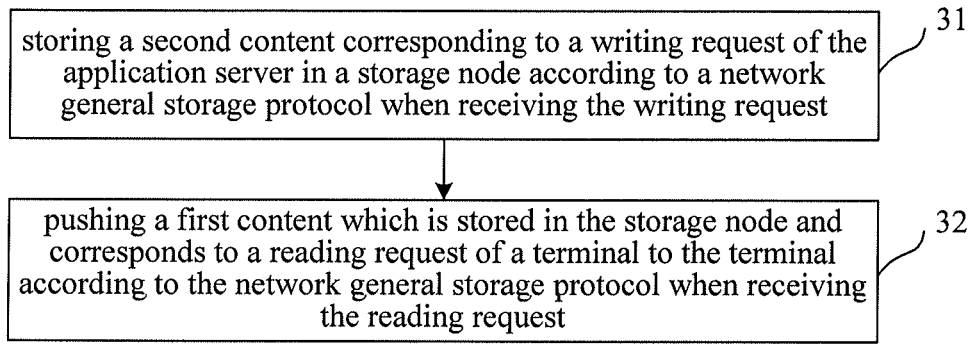
FIG. 3 is a flowchart of the method for processing content provided by the third embodiment of the present disclosure.

FIG. 3 is a flowchart of the method for processing content provided by the third embodiment of the present disclosure. The execution entity of the present embodiment may be the storage node. As shown in FIG. 3, the method includes the following steps:

Step 31: storing a second content corresponding to a writing request in a storage node according to a network general storage protocol when receiving the writing request of the application server.

Step 32: pushing a first content which is stored in the storage node and corresponds to a reading request of a terminal to the terminal according to the network general storage protocol when receiving the reading request.

On the basis of the above solution, optionally, the storage node may further transmit the resource usage information of the storage node to the network storage manager regularly; and/or, the storage node may further receive the inquiry request transmitted by the network storage manager, and transmit the resource usage information of the storage node to the network storage manager according to the inquiry request.

In the method for processing content provided by the present embodiment, the storage node writes and reads the content by following the network general storage protocol. The storage node does not need to interact with the terminal in the application layer, thereby simplifying the structure of the storage node, improving the flexibility of the deployment of the storage nodes, and reducing the costs of system maintenance and update.

Figure 4:
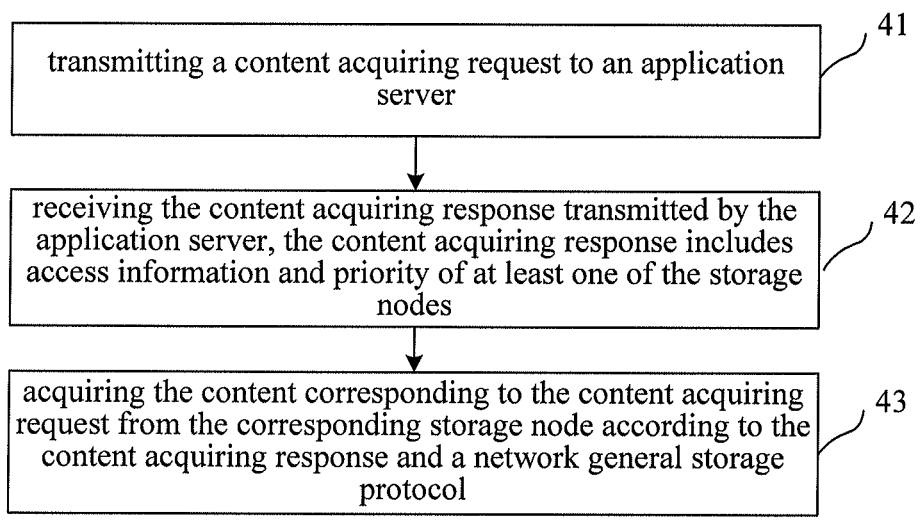
FIG. 4 is a flowchart of the method for acquiring content provided by the fourth embodiment of the present disclosure.

FIG. 4 is a flowchart of the method for acquiring content provided by the fourth embodiment of the present disclosure. The execution entity of the present embodiment may be the terminal. As shown in FIG. 4, the method includes the following steps:

Step 41: transmitting a content acquiring request to an application server.

According to different specific applications, the application layer protocols by which the content acquiring request transmitted by the terminal to the application server is followed may be different. The followed application layer protocol may be HTTP, FTP, etc.

Step 42: receiving the content acquiring response transmitted by the application server, the content acquiring response includes access information and priority of at least one storage node.

After receiving the content acquiring request transmitted by the terminal, the application server may determine the storage node with the highest priority, or one or more storage nodes with relatively high priority, configured to provide content for the terminal, and transmits the access information and the priority of the determined storage node to the terminal.

Step 43: acquiring the content corresponding to the content acquiring request from the corresponding storage node according to the content acquiring response and a network general storage protocol.

Different storage nodes write and read content by following the same network general storage protocol. In an optional embodiment, the content acquiring response includes the respective first access information of a plurality of first storage nodes with relatively high priority in the sorting result, and the priority of the respective first storage nodes. The terminal may select one or more first storage nodes from the received content acquiring response, and acquires the first content needed by the terminal from the selected first storage node(s) according to the first access information of the selected first storage node by following the network general storage protocol. Optionally, if the terminal cannot acquire the content needed by the terminal from the first storage node with the highest priority in the content acquiring response, the terminal may also select other first storage nodes with relatively high priority in the content acquiring response, and acquire the content needed by the terminal from the first storage node, thereby increasing the success ratio of the terminal to acquire the content.

It is known from the above analysis that the method for acquiring content provided by the present embodiment contributes to the acquisition of the needed content by the terminal locally or preferably, improves the user experience and thus reduces the bandwidth burden of the backbone network. In addition, the storage node does not need to interact with the terminal in the application layer, thereby improving the flexibility of the deployment of the storage nodes, and reducing the costs of system maintenance and update.

Figure 5:
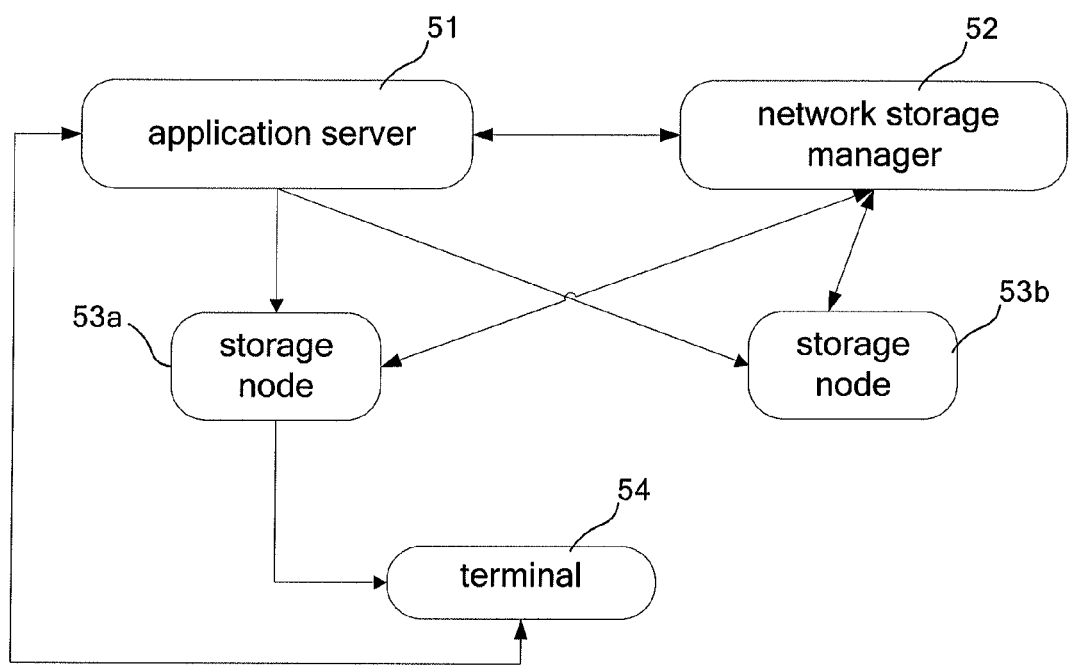
FIG. 5 is a structural schematic diagram of the system for processing content provided by the fifth embodiment of the present disclosure.

FIG. 5 is a structural schematic diagram of the system for processing content provided by the fifth embodiment of the present disclosure. The system for processing content as shown in FIG. 5 includes an application server 51, a network storage manager 52, storage nodes and a terminal 54.

The network storage manager may be configured to perform the method shown in FIG. 2, take charge of the management of the storage node and the optimization of the application layer flow; the storage node may be configured to perform the method shown in FIG. 3, write and read the content according to the network general data storage protocol and report its own resource usage information to the network storage manager; the application server may be configured to perform the method shown in FIG. 1, process the application layer signaling transmitted by the terminal and write data to the storage node; the terminal may be configured to perform the method shown in FIG. 4, transmit the application layer signaling to the application server and read data from the storage node.

In an optional embodiment of the content delivery system as shown in FIG. 5, there may be a plurality of storage nodes connected with the network storage manager, such as the storage node 53a and the storage node 53b, etc. The plurality of storage nodes may be deployed in a distributed way at different regions according to the predetermined strategy; there may be one or more application servers connected with the network storage manager, and the application server may be a source data server of the content and can be deployed according to the application demand of the content provider.

Figure 6:
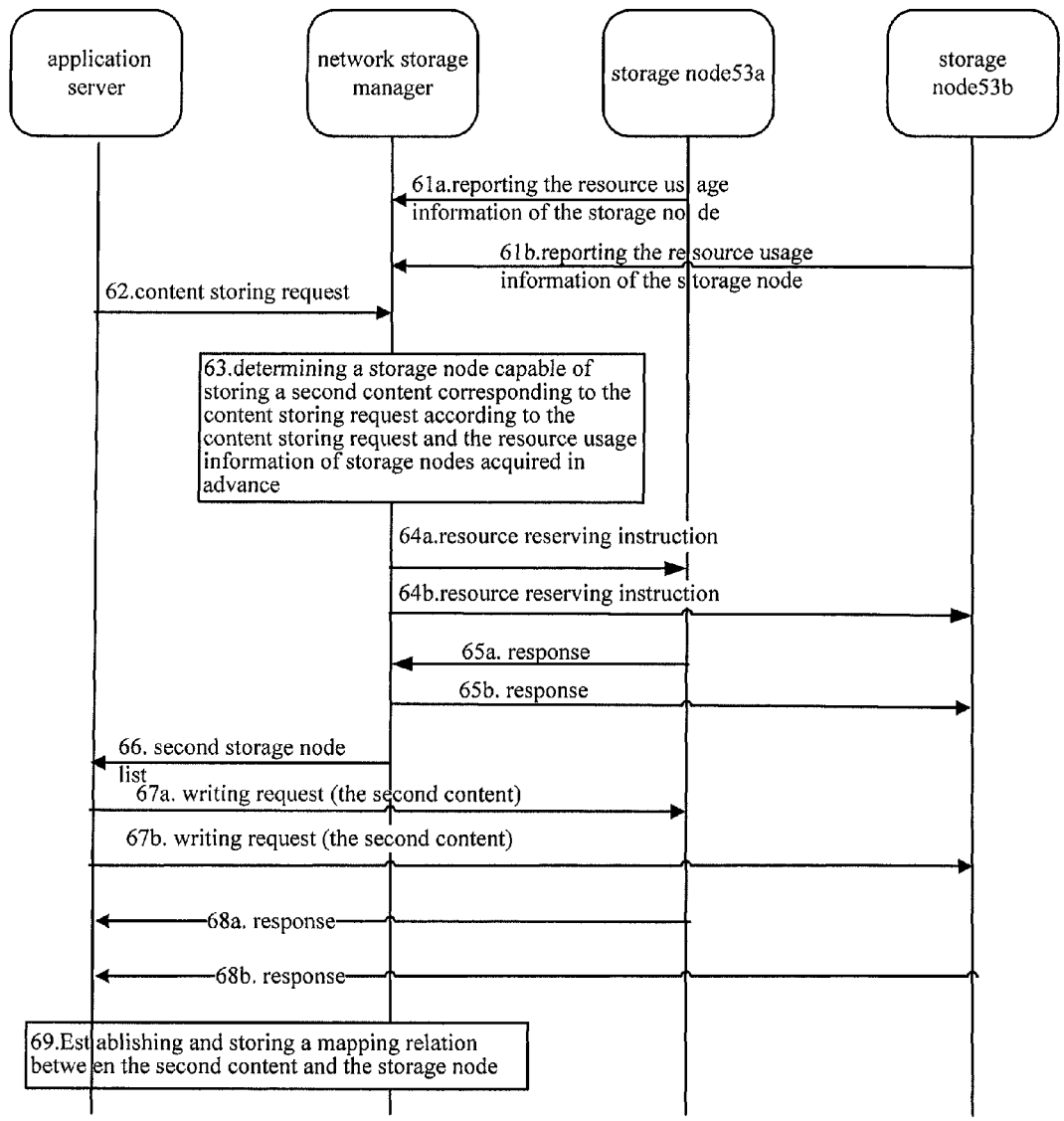
FIG. 6 is a signaling interaction diagram of the method for storing content provided by the sixth embodiment of the present disclosure.
Figure 7:
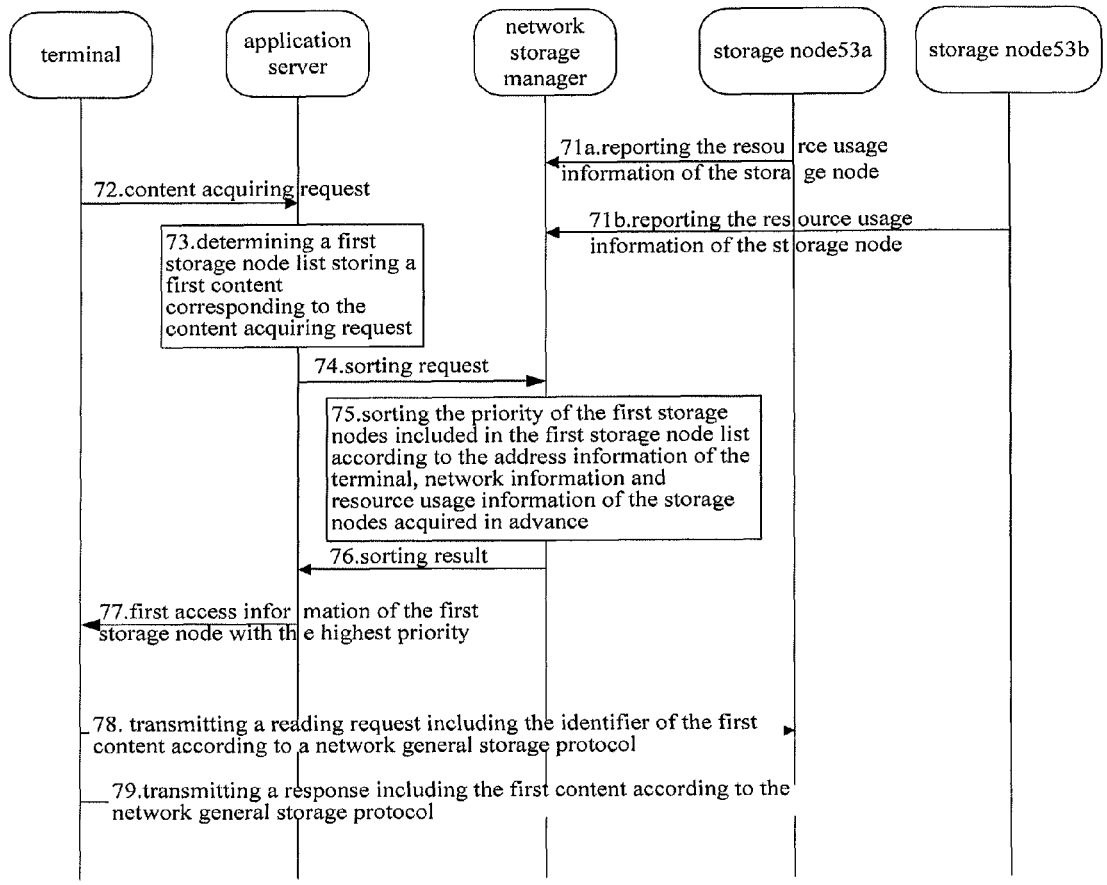
FIG. 7 is a signaling interaction diagram of the method for acquiring content provided by the seventh embodiment of the present disclosure.
Figure 8:
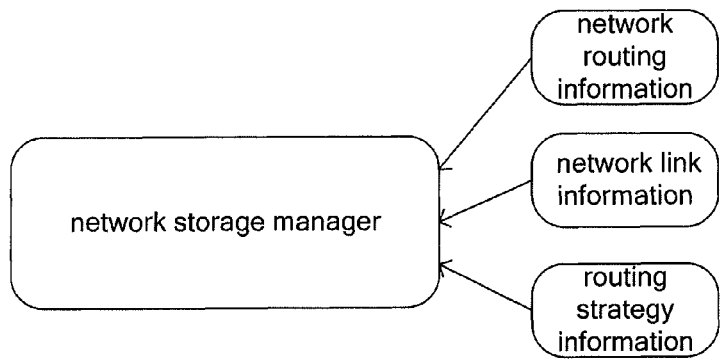
FIG. 8 is an example of the network storage manager collecting network information provided by the eighth embodiment of the present disclosure.

By taking the system for processing content shown in FIG. 5 as an example, the solution of the method for storing content provided by the embodiment of the present disclosure is explained in combination with FIG. 6, and the solution of the method for acquiring content provided by the embodiment of the present disclosure is explained in combination with FIG. 7 and FIG. 8.

FIG. 6 is a signaling interaction diagram of a method for storing content provided by the sixth embodiment of the present disclosure. As shown in FIG. 5 and FIG. 6, the method for storing content provided by the present embodiment includes:

Steps 61a-61b: reporting, by storage nodes in the system for processing content, such as the storage node 53a and the storage node 53b, resource usage information of the storage nodes to the network storage manager.

The usage information of the storage node may include, but not limited to, usage statuses of the resources such as the storage space, network bandwidth, processing ability of CPU, and memory; wherein the usage status of the storage space may include, but not limited to, the following information: total storage space and the used storage space of the storage node; the usage status of the network bandwidth may include, but not limited to, the following information: the total uplink bandwidth of the network and the used network uplink bandwidth, and/or, the total downlink bandwidth of the network and the used network downlink bandwidth.

Optionally, the storage node (such as the storage node 53a and the storage node 53b) may also report its own resource usage information to the network storage manager according to the inquiry request transmitted by the network storage manager.

Step 62: transmitting, by the application server, a content storing request to the network storage manager.

The content storing request may include one or any combination of the following parameters:

the size of the data of the content to be stored;

the region range where the content is to be distributed, that is the geographical positions where the content needs to be distributed;

the copy number of content distribution: the copy number to be distributed; in the practical application, the copy number content distribution may be the total copy number of the content, or, the copy number required by each region where the content needs to be distributed;

bandwidth demand required for providing the content; different applications may have different demands on the bandwidth required for providing the content, for example, the Web page application has a relatively low demand on the bandwidth for providing the content, while the video application has a relatively high demand on the bandwidth, for providing the content, time delay and shaking; therefore, it is possible to specify the demands on the bandwidth, for providing the content, time delay and shaking in the content storing request;

the supported concurrent access number: the maximum total number of concurrent access supported by each of the storage nodes storing content, in the practical application, with respect to the maximum total number of concurrent access supported by each of the storage nodes storing content, it can respectively specify, for each of the regions in which the content needs to be distributed, the maximum total number of concurrent access supported by the storage nodes storing content in each of the regions.

Step 63: determining, by the network storage manager, a storage node configured to store a second content corresponding to the content storing request according to the content storing request and resource usage information of storage nodes acquired in advance.

It is assumed in the present embodiment that the storage nodes configured to store the second content corresponding to the content storing request are the storage node 53a and the storage node 53b.

Steps 64a-64b: transmitting, by the network storage manager, a resource reserving instruction to the storage node configured to store the second content corresponding to the content storing request, such as the storage node 53a and the storage node 53b.

The resource reserving instruction may include but not limited to the storage space to be assigned, the network bandwidth and/or the network connection number, etc. For example, the network storage manager may respectively instruct the resource to be assigned to the storage nodes 53a and 53b according to the carried parameter of the content storing request and the resource usage information of the storage nodes 53a and 53b. For example, the sizes of the storage spaces to be assigned to the storage nodes 53a and 53b are both equal to that of the data of the second content.

Steps 65a-65b: after reserving the corresponding resource according to the resource reserving instruction, transmitting, by the storage node receiving the resource reserving instruction (such as the storage nodes 53a and 53b), the response message (such as "OK" message) of the resource reserving instruction to the network storage manager.

Step 66: transmitting, by the network storage management server, a second storage node list to the application server, the second storage node list includes the second access information of the storage node configured to store the second content corresponding to the content storing request, such as the access information of each of the storage node 53a and the storage node 53b.

Since any of the storage nodes writes and reads the content by following the network general storage protocol, the access information of any of the storage nodes may include one or any combination of the following contents:

an access address of the storage node which may be an IP address, a domain name of the storage node and/or other types of address through which the storage node can be accessed via the network;

an access identifier of the storage node which can be configured to control the access right of the storage node;

information necessary for the access to the storage node by following the network general storage protocol, for example the relative information of the protocol when the network general storage protocol is iSCSI, such as Logical Unit Number (referred to as LUN).

Steps 67a-67b: transmitting, by the application server, a writing request including the second content to a second storage node (such as the storage nodes 53a and 53b) indicated by the second access information according to the network general storage protocol.

The application server receives the second storage node list transmitted by the network storage manager, and respectively writes the second content into the storage nodes 53a and 53b by following the network general storage protocol according to the second access information included in the second storage node list, such as the access information of the storage nodes 53a and 53b.

Optionally, if the second access information includes the access identifier of the storage node (such as the access identifiers of the storage nodes 53a and 53b), the corresponding access identifier is carried in the writing request transmitted by the application server to the storage nodes 53a and 53b, and the storage nodes 53a and 53b verify the access right of the application server according to the access identifier carried in the writing request. Having been verified, the storage nodes 53a and 53b allows the application server to write the second content into the storage node 53a or the storage node 53b by following the network general storage protocol.

Steps 68a-68b: after writing the second content included in the writing request according to the network general storage protocol, transmitting a response message of the writing message (such as "OK" message) to the application server by the storage node (such as the storage nodes 53a and 53b) receiving the writing request.

Step 69: establishing and storing, by the application server, a mapping relation between the second content and the storage node.

Optionally, the application server may establish a mapping relation table in advance. After receiving the response message transmitted by any of the storage nodes when finishing writing the second content, the application server establishes the mapping relation between the content identifier of the second content stored in the storage node and the node identifier of the storage node, and adds the mapping relation between the content identifier and the node identifier to the mapping relation table established in advance to be stored.

In the content storing method provided by the present embodiment, the application server transmits to the network storage manager the content storing request, the network storage manager determines the storage node configured to store the corresponding content according to the content storing request and the resource usage information of storage nodes, and generates the second storage node list including the access information of the storage nodes and feeds back the second storage node list to the application server, and the application server writes the corresponding content into the corresponding storage node according to the network general storage protocol, thereby achieving the distribution storage of the content, contributing to the acquisition of the needed content by the terminal locally or preferably, and reducing the bandwidth burden of the backbone network. In addition, the storage node writes and reads the content according to the network general storage protocol, thereby simplifying the structure of the storage node, improving the flexibility of the deployment of the storage nodes and the convenience of maintaining the storage nodes, and reducing the system management cost.

FIG. 7 is a signaling interaction diagram of the method for acquiring content provided by the seventh embodiment of the present disclosure. As shown in FIG. 5 and FIG. 7, the method for acquiring content provided by the present embodiment includes:

Steps 71a-71b: reporting, by storage nodes in the system for processing content, such as the storage node 53a and the storage node 53b, resource usage information of the storage nodes to a network storage manager.

The usage information of the storage node may include, but not limited to, usage statuses of the resources such as the storage space, network bandwidth, processing ability of CPU; wherein the usage status of the storage space may include, but not limited to, the following information: total storage space and the used storage space of the storage node;

the usage status of the network bandwidth may include, but not limited to, the following information: the total uplink bandwidth of the network and the used network uplink bandwidth, and/or, the total downlink bandwidth of the network and the used network downlink bandwidth.

Optionally, the storage node (such as the storage node 53a and the storage node 53b) may also report its own resource usage information to the network storage manager after receiving the inquiry request transmitted by the network storage manager.

Step 72: transmitting, by a terminal, a content acquiring request to the application server.

The content acquiring request may include, but not limited to, the content identifier of the first content needed to be acquired. According to different specific applications, the application layer protocols by which the content acquiring request transmitted by the terminal to the application server is followed may be different. The followed application layer protocol may be HTTP, FTP, etc.

Step 73: determining, by the application server, a first storage node list storing a first content corresponding to the content acquiring request according to a mapping relation acquired in advance between contents and storage nodes.

When receiving the content acquiring request, the application server determines first storage nodes storing the first content corresponding to the content acquiring request. For example, the application server may search the storage nodes corresponding to the content identifier of the first content in the mapping relation table established in advance, in which the found storage nodes are the first storage node, and generate the first storage node list including the information of the found first storage nodes.

Step 74: transmitting, by the application server, a sorting request to the network storage manager, the sorting request includes the first storage node list and address information of the terminal.

The application server transmits the sorting request to the network storage manager, for requesting the network storage manager to sort the first storage nodes included in the first storage node list according to the priorities, so as to determine the optimal storage node which provides the first content for the terminal.

Step 75: sorting, by the network storage manager, the priority of each of the first storage nodes in the first storage node list according to the address information of the terminal, network information and resource usage information of storage nodes acquired in advance.

The network storage manager may collect the network information which may include, as shown in FIG. 8, but not limited to, one or any combination of the following contents:

the network routing information, including the network routing information generated by Interior Gateway Protocols (referred to as IGP), such as Open Shortest Path First (referred to as OSPF) protocol and Intermediate System to Intermediate System Routing Protocol (referred to as IS-IS); and/or the network routing information generated by Exterior Gateway Protocol (referred to as EGP), such as Border Gateway Protocol (referred to as BGP). The network routing information may further include the static routing information and so on;

the network link information, such as the usage information of the network link, including, but not limited to, the busy/idle status information of the link, the utilization percentage information of the link, etc;

the routing strategy information; it is possible to configure in advance a general strategy for determining the priority of the network path.

The network storage manager may acquire the resource usage information of a storage node by means of the storage node reporting voluntarily or the network storage manager searching; the acquired resource usage information of the storage node may include, but not limited to, one or any combination of the following contents: usage statuses of the resources such as the storage space, network bandwidth, processing ability of CPU, etc; wherein the usage status of the storage space may include, but not limited to, the following information: total storage space and the used storage space of the storage node; the usage status of the network bandwidth may include, but not limited to, the following information: the total uplink bandwidth of the network and the used network uplink bandwidth, and/or, the total downlink bandwidth of the network and the used network downlink bandwidth.

When receiving the sorting request, the network storage manager sorts the priority of each of the first storage nodes in the first storage node list according to the address information of the terminal, the currently collected network information and the currently acquired resource usage information of storage nodes.

In an optional embodiment of a weighted calculation of the priority of the storage nodes, the network storage manager firstly calculates the priority of a certain storage node according to the network information including the address information of the terminal, to obtain a value referred to as "Cost1", and sets in advance the weight of the network information for the whole priority sorting, indicated as "Weight1". Next, the network storage manager calculates the priority of the storage node according to the resource usage information, to obtain a value referred to as "Cost2", and sets in advance the weight of the network information for the whole priority sorting, indicated as "Weight2". Finally, the priority of the storage node is calculated by using the following expression: the priority of the storage node=(Cost1×Weight1)+(Cost2×Weight2).

The network storage manager may respectively calculate the priority of the storage node for each of the first storage nodes in the first storage node list by adopting the above weighted calculation method, and sort each of the first storage nodes included in the first storage node list according to the calculated priority of the each first storage node. It is to be noted that the above weighted calculation method is only an optional embodiment, and persons skilled in the art may adopt other calculation methods to determine the priority of the storage node.

Step 76: transmitting, by the network storage manager, the sorting result to the application server.

The sorting result may include, but not limited to, the first storage node list in which the sequence of the first storage nodes is adjusted.

Step 77: determining, by the application server, first access information of the first storage node with the highest priority from the sorting result, and transmitting to the terminal the content requesting response including the first access information of the first storage node with the highest priority.

It is assumed in the embodiment that the storage nodes configured to provide the first content for the terminal are the storage nodes 53a and 53b and the first storage node list includes the node identifiers of the storage nodes 53a and 53b. The network storage manager sorts the priority of providing the content for the terminal by the storage nodes 53a and 53b, and adjusts the order of the storage nodes in the first storage node list according to the priorities of the storage nodes 53a and 53b. The application server may determine the storage node with the highest priority (such as the storage node 53*a*) according to the first storage node list returned by the network storage manager, and transmits the access information of the storage node 53*a* to the terminal.

Step 78: transmitting, by the terminal, a reading request including the identifier of the first content needed by the terminal to the storage node indicated by the first access information (such as the storage node 53*a*) according to a network general storage protocol.

Step 79: reading, by the storage node receiving the reading request (such as the storage node 53*a*), the first content, and transmitting a response message including the first content to the terminal according to the network general storage protocol.

In the method for acquiring content provided by the embodiment of the present disclosure, the terminal transmits the content acquiring request following different application protocols to the application server according to practical applications, the application server determines the storage node which stores the content needed by the terminal and requests the network storage manager to perform sorting, the network storage manager feeds back the sorting result to the application server, and the application server determines the storage node configured to provide content for the terminal according to the sorting result, thereby contributing to the acquisition of the needed content by the terminal locally or preferably, improving the user experience and reducing the bandwidth burden of the backbone network. In addition, since the processing ability of the application layer protocol is peeled off from the storage node in the present embodiment, the storage node writes and reads the content by following the network general storage protocol, simplifying the structure of the storage node, improving the flexibility of the deployment of the storage nodes and the convenience of maintaining the storage nodes, and reducing the system management cost.

Figure 9:
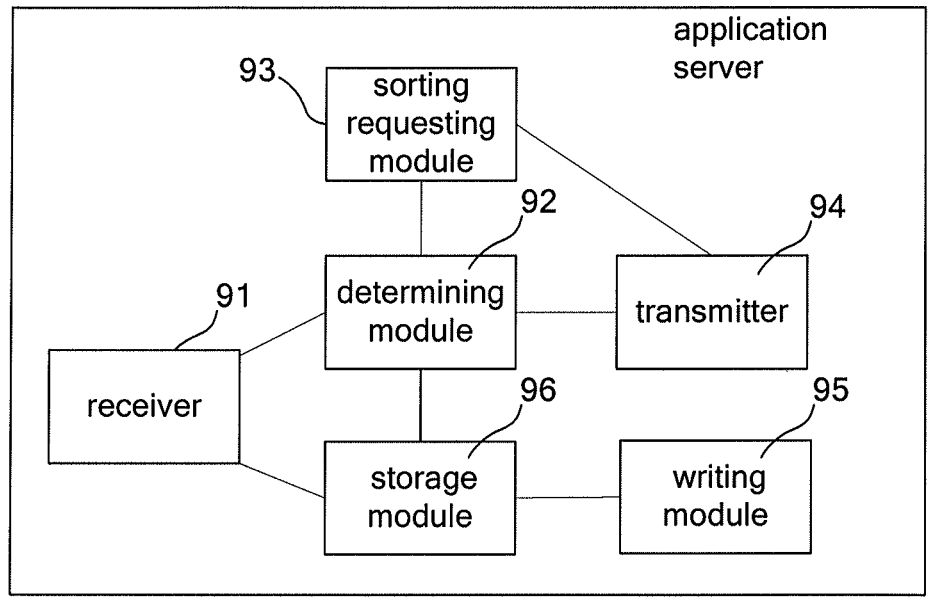
FIG. 9 is a structural schematic diagram of the application server provided by the ninth embodiment of the present disclosure.

FIG. 9 is a structural schematic diagram of the application server provided by the ninth embodiment of the present disclosure. The application server as shown in FIG. 9 includes a receiver 91, a determining module 92, a sorting requesting module 93 and a transmitter 94.

The receiver 91 can be configured to receive a content acquiring request transmitted by a terminal.

The determining module 92 may be configured to determine, after receiving the content acquiring request transmitted by the terminal, a first storage node list which stores a first content corresponding to the content acquiring request according to a mapping relation acquired in advance between contents and storage nodes; the first storage node list includes a plurality of first storage nodes.

The sorting requesting module 93 may be configured to transmit a sorting request to a network storage management server; the sorting request includes the first storage node list and address information of the terminal, and the sorting request is configured to request sorting the first storage nodes in the first storage node list.

The receiver 91 may further be configured to receive a sorting result transmitted by the network storage management server; the sorting result includes a priority of each of the first storage nodes in the first storage node list.

The transmitter 94 may be configured to transmit a content acquiring response to the terminal, the content acquiring response includes first access information and priority of at least one of the first storage nodes, so that the terminal acquires the first content from the corresponding first storage node according to the content acquiring response and a network general storage protocol.

Optionally, the application server may further include a writing module 95 and a storage module 96.

The transmitter 94 may be further configured to transmit a content storing request to the network storage management server.

The receiver 91 may be further configured to receive the second storage node list transmitted by the network storage management server, the second storage node list includes the second access information of the second storage node configured to store the second content corresponding to the content storing request.

The writing module 95 may be configured to write the second content into the second storage node indicated by the second access information according to the network general storage protocol.

The storage module 96 may be configured to establish and store the mapping relation between the second content and the second storage node.

When receiving the content acquiring request transmitted by the terminal, the application server provided by the present embodiment transmits the sorting request for sorting the storage nodes storing the corresponding content to the network management server, and transmits to the terminal the access information of one or more storage nodes with relatively high priority according to the acquired sorting result, and the terminal acquires the content needed by the terminal from the corresponding storage node by following the network general storage protocol, thereby contributing to the acquisition of the needed content by the terminal locally or preferably, improving the user experience and reducing the bandwidth burden of the backbone network. In addition, since the processing ability of the application layer protocol is peeled off from the storage node in the present embodiment, the storage node writes and reads the content by following the network general storage protocol, thereby simplifying the structure of the storage node. The storage node does not need to interact with the terminal in the application layer, thereby improving the flexibility of the deployment of the storage nodes and the convenience of maintaining the storage nodes, and reducing the system management cost. The operation principle of the application server provided by the embodiment can refer to the statements of the corresponding embodiments in FIGS. 1, 6 and 7, without repeated description here.

Figure 10:
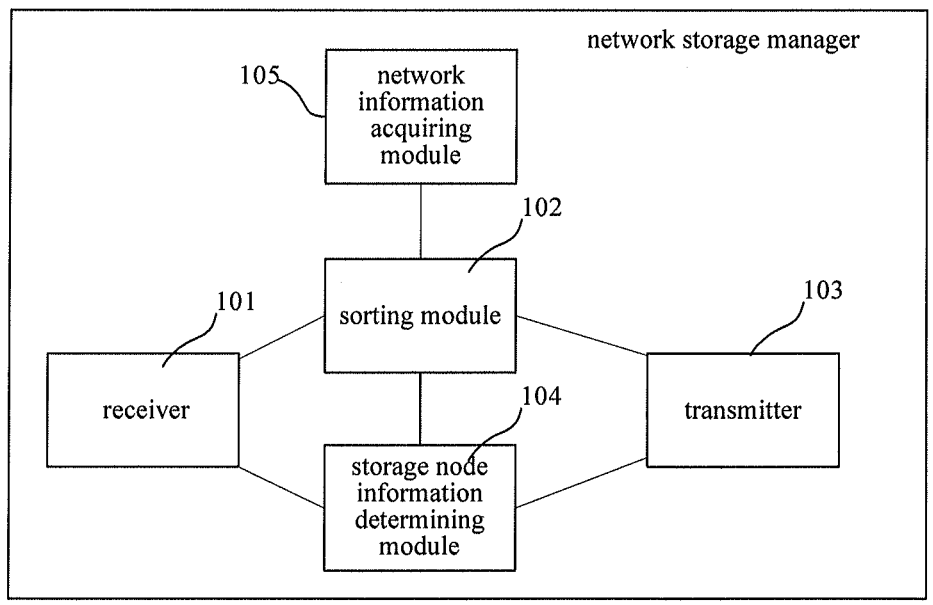
FIG. 10 is a structural schematic diagram of the network storage manager provided by the tenth embodiment of the present disclosure.

FIG. 10 is a structural schematic diagram of the network storage manager provided by the tenth embodiment of the present disclosure. The network storage manager as shown in FIG. 10 includes a receiver 101, a sorting module 102 and a transmitter 103.

The receiver 101 may be configured to receive a sorting request transmitted by an application server, the sorting request includes a first storage node list and address information of a terminal, and the sorting request is configured to request sorting the first storage nodes in the first storage node list.

The sorting module 102 may be configured to sort each of the first storage nodes in the first storage node list according to the address information of the terminal, network information and resource usage information of storage nodes acquired in advance.

The transmitter 103 may be configured to transmit a sorting result to the application server, the sorting result includes a priority of each of the first storage nodes of the first storage node list.

Optionally, on the basis of the above solution, the network storage manager may further include a storage node information determining module 104.

The receiver 101 may be further configured to receive the content storing request transmitted by the application server.

The storage node information determining module 104 may be configured to determine the second storage node list according to the content storing request and the resource usage information of storage nodes acquired in advance.

The transmitter 103 may be further configured to transmit the second storage node list to the application server; the second storage node list includes the second access information of the storage node configured to store the second content corresponding to the content storing request, so that the application server writes the second content into the storage node indicated by the second access information according to the network general storage protocol.

Optionally, on the basis of the above solution, the transmitter 103 may be further configured to transmit a resource reserving instruction to the second storage node.

The receiver 101 may be further configured to receive the response message of the resource reserving instruction transmitted by the second storage node.

Optionally, on the basis of the above solution, the network storage manager may further include a network information acquiring module 105 and a storage node information acquiring module (not shown in the drawing).

The network information acquiring module 105 may be configured to acquire network information; the network information includes one or any combination of the following: the network routing information, the network link information and the routing strategy information.

The storage node information acquiring module may be configured to acquire the resource usage information of storage nodes.

The sorting module 102 may sort the priority of each of the first storage nodes in the first storage node list included in the sorting request according to the sorting request received by the receiver 101, the network information acquired by the network information acquiring module 105, and the resource usage information of storage nodes acquired by the storage node information acquiring module.

The storage node information determining module 104 may determine the second storage node list according to the content storing request received by the receiver 101 and the resource usage information of storage nodes acquired by the storage node information acquiring module.

Optionally, for different ways of acquiring the resource usage information of a storage node, the storage node information acquiring module may be specifically configured to receive the resource usage information of the storage node reported by the storage node regularly; or, transmit an inquiry request to the storage nodes, and receive the resource usage information of the storage nodes reported by the storage node according to the inquiry request.

The network storage manager provided by the present embodiment receives the sorting request transmitted by the application server, sorts the priorities of the storage nodes storing the content needed by the terminal according to the address information of the terminal, the network information and resource usage information of storage nodes acquired in advance, and feeds back the sorting result to the application server, and the application server determines the storage node configured to provide content for the terminal according to the sorting result, thereby contributing to the acquisition of the needed content by the terminal locally or preferably, improving the user experience and reducing the broadband burden of the backbone network. In addition, the storage node does not need to interact with the terminal in the application layer, thereby simplifying the structure of the storage node, improving the flexibility of the deployment of the storage nodes and the convenience of maintaining the storage nodes, and reducing the system management cost. The operation principle of the network storage manager provided by the embodiment can refer to the statements of the corresponding embodiments in FIGS. 2, 6-8, without repeated description here.

Figure 11:
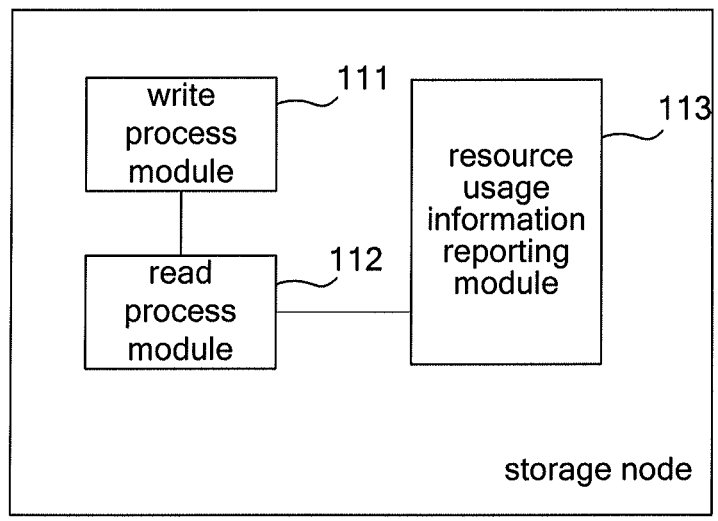
FIG. 11 is a structural schematic diagram of the storage node provided by the eleventh embodiment of the present disclosure.

FIG. 11 is a structural schematic diagram of the storage node provided by the eleventh embodiment of the present disclosure. The storage node as shown in FIG. 11 includes a write process module 111 and a read process module 112.

The write process module 111 may be configured to store a second content corresponding to a writing request on the storage node according to a network general storage protocol when receiving the writing request of the application server.

The read process module 112 may be configured to push a first content which is stored in the storage node and corresponds to a reading request to a terminal according to the network general storage protocol when receiving the reading request of the terminal.

Optionally, on the basis of the above solution, the storage node may further include a resource usage information reporting module 113.

The resource usage information reporting module 113 may be configured to transmit the resource usage information of the storage node to the network storage manager regularly; and/or, receives an inquiry request transmitted by the network storage manager, and transmit the resource usage information of the storage node to the network storage manager according to the inquiry request.

The storage node provided by the present embodiment writes and reads the content according to the network general storage protocol. The storage node does not need to interact with the terminal in the application layer, thereby simplifying the structure of the storage node, improving the flexibility of the deployment of the storage nodes and the convenience of maintaining the storage nodes, and reducing the system management cost. The operation principle of the storage node provided by the embodiment can refer to the statements of the corresponding embodiments in FIGS. 3, 6 and 7, without repeated description here.

Figure 12:
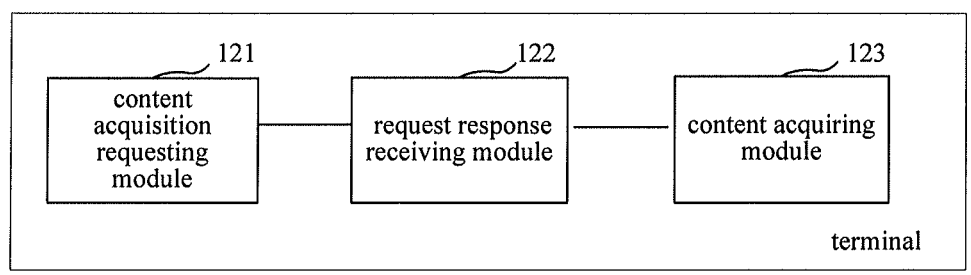
FIG. 12 is a structural schematic diagram of the terminal provided by the twelfth embodiment of the present disclosure.

FIG. 12 is a structural schematic diagram of the terminal provided by the twelfth embodiment of the present disclosure. The terminal as shown in FIG. 12 includes a content acquisition requesting module 121, a request response receiving module 122 and a content acquiring module 123.

The content acquisition requesting module 121 may be configured to transmit the content acquiring request to the application server.

The request response receiving module 122 may be configured to receive a content acquiring response transmitted by the application server, the content acquiring response includes access information and priority of at least one storage node.

The content acquiring module 123 may be configured to acquire the content corresponding to the content acquiring request from the corresponding first storage node according to the content acquiring response and a network general storage protocol.

The terminal provided by the present embodiment transmits the content acquiring request following different application protocols to the application server according to practical applications, acquires the content acquiring request response fed back by the application server, and reads the content needed by the terminal from the corresponding storage node according to the content acquiring request response by following the network general storage protocol, thereby contributing to the acquisition of the needed content by the terminal locally or preferably, improving the user experience and reducing the bandwidth burden of the backbone network.

Persons skilled in the art can appreciate that the drawing is only the schematic diagram of an embodiment, and the module or flow in the drawing is not necessarily required for implementing the present disclosure.

Persons skilled in the art can appreciate that the modules in the device of the embodiment can be distributed in the device of the embodiment according to the description of the embodiment, or can be positioned in one or more devices different from the present embodiment through corresponding changes. The modules of the above embodiments can be merged into one module, or can be further divided into a plurality of sub modules.

Persons skilled in the art can appreciate that all or part of the steps for implementing the above method embodiments can be realized by the hardware related to the program instructions. The program can be stored in a computer-readable storage medium, and performs the steps of the above method embodiments when executed. The storage medium may include various media configured to store program codes, such as ROM, RAM, magnetic disk, or optical disk, etc.

Finally, it is to be noted that the above embodiments are only used for explaining the solution of the present disclosure, instead of a limitation thereof. Although the present disclosure is described in detail with reference to the above embodiments, persons skilled in the art shall appropriate that the solution stated in the aforementioned embodiments can be amended, or part of the technical features thereof can be substituted. The amendments or substitutions do not make the corresponding solution depart from the spirit and the scope of the solution of the embodiments in the present disclosure.

What is claimed is:

1. A method for processing content, comprising:
receiving, by a server having a processor, a content acquiring request transmitted by a terminal;
determining, by the server, a first storage node list according to a mapping relation acquired in advance between contents and storage nodes, wherein the first storage node list comprise a plurality of first storage nodes and the plurality of first storage nodes store a first content corresponding to the content acquiring request;
transmitting, by the server, a sorting request to a network storage management server and receiving a sorting result transmitted by the network storage management server; wherein the sorting request comprises the first storage node list and address information of the terminal, and is configured to request sorting the plurality of first storage nodes; and wherein the sorting result comprises a priority of each of the plurality of first storage nodes;
transmitting a content acquiring response to the terminal, the content acquiring response comprising first access information and priority of at least one of the first storage nodes, so that the terminal acquires the first content from a corresponding first storage node according to the content acquiring response and a network general storage protocol;
transmitting a content storing request to the network storage management server;
receiving a second storage node list transmitted by the network storage management server, wherein the second storage node list comprises second access information of a second storage node configured to store a second content corresponding to the content storing request;
writing the second content into the second storage node indicated by the second access information according to the network general storage protocol; and
establishing and storing a mapping relation between the second content and the second storage node.

2. A method for processing content, implemented by a network storage manager processor and a computer-readable storage medium having instructions stored therein such that when executed, the processor performs:
receiving a sorting request transmitted by an application server, wherein the sorting request comprises a first storage node list and address information of a terminal, and is configured to request sorting first storage nodes in the first storage node list;
sorting each of the first storage nodes in the first storage node list according to the address information of the terminal, network information and resource usage information of storage nodes acquired in advance; and
transmitting a sorting result to the application server, the sorting result comprises a priority of each of the first storage nodes of the first storage node list;
receiving a content storing request transmitted by the application server; and
determining a second storage node list according to the content storing request and the resource usage information of storage nodes acquired in advance and transmitting the second storage node list to the application server, so that the application server writes the second content corresponding to the content storing request into a second storage node indicated by the second access information according to a network general storage protocol; the second storage node list comprises second access information of the second storage node configured to store the second content.

3. The method according to claim 2, wherein before transmitting the second storage node list to the application server, further comprising:
transmitting a resource reserving instruction to the second storage node; and
receiving a response message of the resource reserving instruction transmitted by the second storage node.

4. The method according to claim 2, further comprising:
acquiring the network information and the resource usage information of storage nodes; the network information comprises one or any combination of the following: network routing information, network link information and routing strategy information.

5. The method according to claim 2, wherein acquiring the resource usage information of storage nodes comprises:
receiving resource usage information of a storage node reported by the storage node regularly;
or,
transmitting an inquiry request to the storage node, and receiving the resource usage information of the storage node reported by the storage node according to the inquiry request.

6. The method according to claim 4, wherein acquiring the resource usage information of storage nodes comprises:
receiving resource usage information of a storage node reported by the storage node regularly;
or, transmitting an inquiry request to the storage node, and receiving the resource usage information of the storage node reported by the storage node according to the inquiry request.

7. An application server, comprising:
a processor and a computer readable storage medium having instructions stored therein, wherein the instructions configure the processor to:
receive a content acquiring request transmitted by a terminal;
determine a first storage node list according to a mapping relation acquired in advance between contents and storage nodes, wherein the first storage node list comprises a plurality of first storage nodes and the plurality of first storage nodes store a first content corresponding to the content acquiring request;
transmit a sorting request to a network storage management server; wherein the sorting request comprises the first storage node list and address information of the terminal, and is configured to request sorting the plurality of first storage nodes;
receive a sorting result transmitted by the network storage management server; the sorting result comprises a priority of each of the plurality of first storage nodes; and
transmit a content acquiring response to the terminal, the content acquiring response comprising first access information and priority of at least one of the first storage nodes, so that the terminal acquires the first content from the corresponding first storage node according to the content acquiring response and a network general storage protocol;
transmit a content storing request to the network storage management server;
receive the second storage node list transmitted by the network storage management server, the second storage node list comprises second access information of the second storage node configured to store a second content corresponding to the content storing request;
write the second content into the second storage node indicated by the second access information according to the network general storage protocol; and
establish and store the mapping relation between the second content and the second storage node.

8. A network storage manager, comprising:
a processor and a computer readable storage medium having instructions stored therein, wherein the instructions configure the processor to:
receive a sorting request transmitted by an application server, the sorting request comprises a first storage node list and address information of a terminal, and is configured to request sorting first storage nodes in the first storage node list;
sort each of the first storage nodes comprised in the first storage node list according to the address information of the terminal, network information and resource usage information of storage nodes acquired in advance; and
transmit a sorting result to the application server, the sorting result comprises a priority of each of the first storage nodes of the first storage node list;
receive a content storing request transmitted by the application server;
determine a second storage node list according to the content storing request and the resource usage information of storage nodes acquired in advance; and
transmit the second storage node list to the application server; the second storage node list comprises second access information of a storage node configured to store a second content corresponding to the content storing request, so that the application server writes the second content into the storage node indicated by the second access information according to the network general storage protocol.

9. The network storage manager according to claim 8, wherein the processor is further configured to:
transmit a resource reserving instruction to the second storage node; and
receive the response message of the resource reserving instruction transmitted by the second storage node.

10. The network storage manager according to claim 8, wherein the processor is further configured to:
acquire the network information; the network information comprises one or any combination of the following: the network routing information, the network link information and the routing strategy information; and
acquire the resource usage information of storage nodes.

11. The network storage manager according to claim 10, wherein the processor is further configured to:
receive resource usage information of a storage node reported by the storage node regularly; or, transmit an inquiry request to the storage node, and receive the resource usage information of the storage node reported by the storage node according to the inquiry request.

12. A system for processing content, comprising:
an application server comprising an application server processor and a computer readable storage medium having instructions stored therein, wherein the instructions configure the application server processor to:
receive a content acquiring request transmitted by a terminal;
determine, according to a mapping relation acquired in advance between contents and storage nodes, a first storage node list which comprises a plurality of first storage nodes; each first storage node stores a first content corresponding to the content acquiring request after receiving the content acquiring request transmitted by the terminal;
transmit a sorting request to a network storage management server; the sorting request comprises the first storage node list and address information of the terminal, and is configured to request sorting the plurality of first storage nodes;
receive a sorting result transmitted by the network storage management server; the sorting result comprises a priority of each of the plurality of first storage nodes; and
transmit a content acquiring response to the terminal, the content acquiring response comprising first access information and priority of at least one of the first storage nodes, so that the terminal acquires the first content from the corresponding first storage node according to the content acquiring response and a network general storage protocol; and
a network storage manager comprising a network storage manager processor and a computer readable storage medium having instructions stored therein, wherein the instructions configure the network storage manager processor to:
receive a sorting request transmitted by the application server, the sorting request comprises a first storage node list and address information of a terminal, and is configured to request sorting first storage nodes in the first storage node list;

sort each of the first storage nodes comprised in the first storage node list according to the address information of the terminal, network information and resource usage information of storage nodes acquired in advance; and transmit a sorting result to the application server, the sorting result comprises a priority of each of the first storage nodes of the first storage node list;

wherein the application server processor is further configured to:

transmit a content storing request to the network storage management server;

receive the second storage node list transmitted by the network storage management server, the second storage node list comprises second access information of the second storage node configured to store a second content corresponding to the content storing request;

write the second content into the second storage node indicated by the second access information according to the network general storage protocol; and establish and store the mapping relation between the second content and the second storage node.

13. The system for processing content according to claim 12, wherein the network storage manager processor is further configured to:

receive a sorting request transmitted by an application server, the sorting request comprises a first storage node list and address information of a terminal, and is configured to request sorting first storage nodes in the first storage node list;

sort each of the first storage nodes comprised in the first storage node list according to the address information of the terminal, network information and resource usage information of storage nodes acquired in advance; and transmit a sorting result to the application server, the sorting result comprises a priority of each of the first storage nodes of the first storage node list.

14. The system for processing content according to claim 12, wherein the processor of the network storage manager is further configured to transmit a resource reserving instruction to the second storage node; and receive the response message of the resource reserving instruction transmitted by the second storage node.

15. The system for processing content according to claim 12, wherein the processor of the network storage manager is further configured to acquire the network information; the network information comprises one or any combination of the following: the network routing information, the network link information and the routing strategy information; and acquire the resource usage information of storage nodes.

16. The system for processing content according to claim 12, wherein the network storage manager processor is further configured to:

receive resource usage information of a storage node reported by the storage node regularly; or, transmit an inquiry request to the storage node, and receive the resource usage information of the storage node reported by the storage node according to the inquiry request.

* * * * *